May 2, 1939.　　　　B. J. SADOFF　　　　2,156,771
HOG-HEAD CONVEYER
Filed May 10, 1937　　　3 Sheets-Sheet 1

ATTEST
Norbert E. Birch
Wm. C. Meiser

Bernard J. Sadoff
INVENTOR

BY
ATTORNEY

May 2, 1939.  B. J. SADOFF  2,156,771
HOG-HEAD CONVEYER
Filed May 10, 1937  3 Sheets-Sheet 2

Bernard J. Sadoff
INVENTOR

May 2, 1939.　　　　B. J. SADOFF　　　　2,156,771
HOG-HEAD CONVEYER
Filed May 10, 1937　　　3 Sheets-Sheet 3
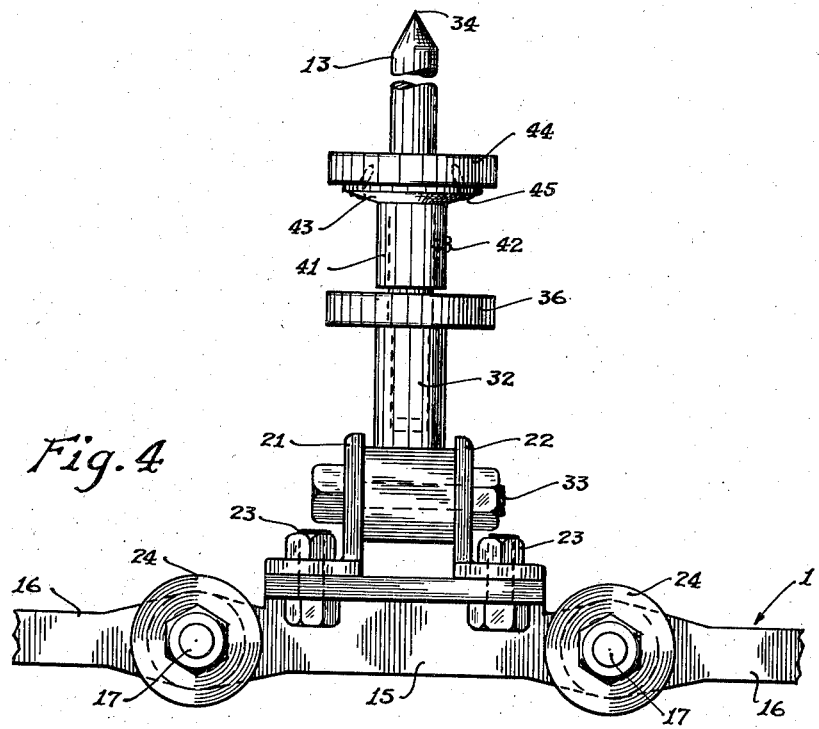
Fig. 4
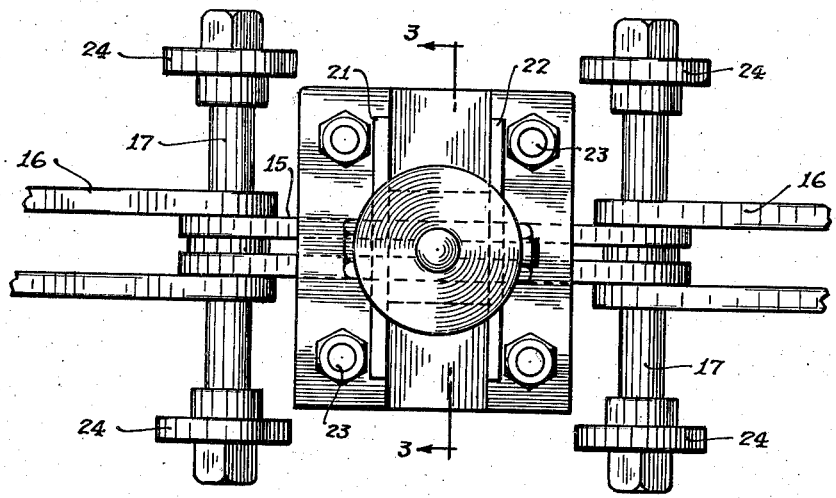
Fig. 5
ATTEST:
Norbert E. Birch
Wm. C. Meiser
Bernard J. Sadoff
INVENTOR
BY 
ATTORNEY Patented May 2, 1939

2,156,771

UNITED STATES PATENT OFFICE 2,156,771

HOG-HEAD CONVEYER

Bernard J. Sadoff, Buenos Aires, Argentina, assignor to Industrial Patents Corporation, Chicago, Ill., a corporation of Delaware Application May 10, 1937, Serial No. 141,854

2 Claims. (Cl. 17—1)

This invention relates to means for conveying the heads of animal carcasses during trimming thereof.

One of the objects of the invention is to provide an improved hog head conveyer.

Another object of the invention is to provide an improved means for conveying the heads of animal carcasses for trimming.

Another object of the invention is to provide an improved means for conveying the heads of animal carcasses through a predetermined path, which path is defined by a series of changing positions suitably adapted for trimming of the heads.

Other objects of the invention will be apparent from the description and claims which follow.

The device of the present invention comprises a conveying means provided with a series of spaced pins pivotally mounted for movement sidewise of the normal line of travel of the conveying means and guide means for moving the pins through a series of predetermined positions suitably adapted for trimming the heads of carcasses carried thereover.

By way of illustration, but without limiting the scope of the invention, the device will be more specifically described for use in trimming the heads of hog carcasses.

In accordance with the present invention, the severed heads of hog carcasses are individually mounted on successive pins of the conveying means and are free to revolve through 360° about the pin as an axis. The heads carried on the pins are moved in a predetermined path by the conveying means, sidewise movement being periodically effected to provide a series of successive positions suitably adapted for the several trimming operations.

Reference is had to the drawings in which like characters of reference are used to designate similar elements.

Figure 4 is an enlarged side view illustrating one of the head carrying pins.

Figure 5 is a top plan view of Figure 4.

Figure 1:
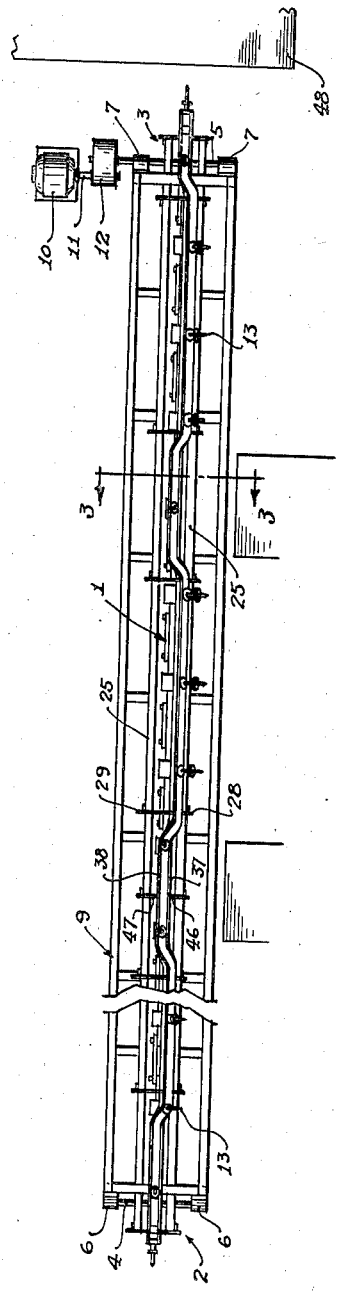
Figure 1 is a plan view of a conveying means constructed in accordance with the present invention.
Figure 2:
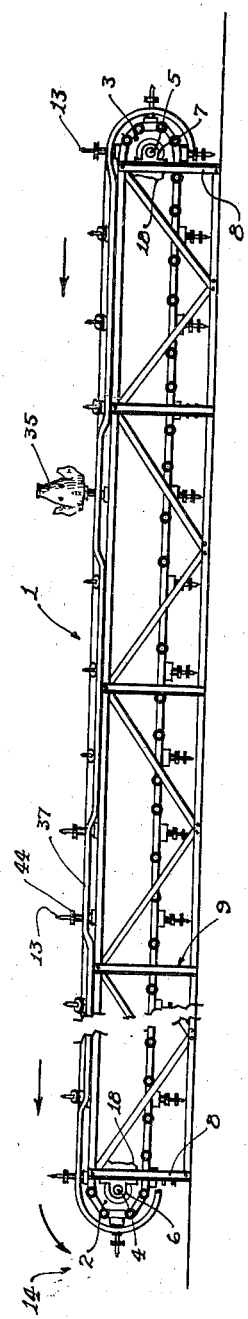
Figure 2 is a side elevational view of the device shown in Figure 1.

The device of the present invention comprises endless conveying means 1 adapted for travel on sprockets 2 and 3 rigidly secured to shafts 4 and 5 journaled in bearings 6 and 7. Bearings 6 and 7 are rigidly secured to uprights 8 of framework 9 suitably constructed for supporting conveying means 1.

Conveying means 1 is driven by power transmitted from motor 10 through shaft 11 and gear box 12, the gear box 12 being suitably connected with shaft 5.

Conveying means 1 is provided with a series of spaced pins 13 and may be vertically mounted in framework 9 so that at its discharge end 14 the pins 13 will be revolved in a downward direction to discharge trimmed heads to a slide, or other suitable conveying means, for transfer to a remote point.

Figure 3:
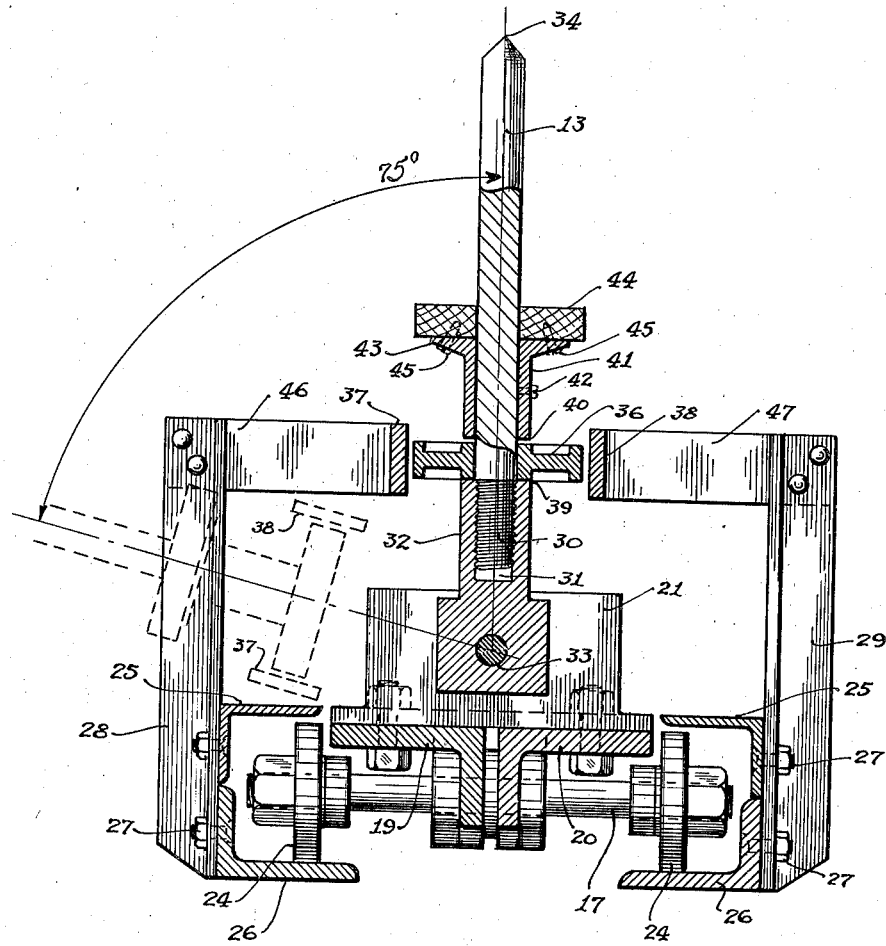
Figure 3 is an enlarged detail view, partly in section, taken substantially on line 3—3 of Figure 1.

Reference is now had to Figures 3, 4 and 5 in which it is seen that conveying means 1 comprises a series of alternate links 15 and 16 pivotally connected through suitable openings as by shafts 17, the links 16 being adapted for mesh with teeth 18 of sprockets 2 and 3 and the links 15 being suitably flanged, as at 19 and 20, for rigidly securing pin carrying brackets 21 and 22 as by bolts 23. It will be understood that only links 15 occurring relative to the spacing of pins 13 need be flanged as at 19 and 20.

Shafts 17 are provided at either of their ends with rollers 24 adapted for travel between rails 25 and 26 rigidly secured, as by bolts 27, to opposed uprights 28 and 29 of framework 9. It will be seen that the shafts 17 through rollers 24 and rails 26 serve to rigidly support the conveying means in a horizontal plane during traveling of the conveying means between sprockets 2 and 3.

Pins 13 are threaded, as at 30, within opening 31 of pivot arm 32, the pivot arm 32 being pivotally mounted, as by bolt 33, between pin carrying brackets 21 and 22. Pins 13 may be tapered at their free ends, as at 34, to facilitate mounting of the heads 35 thereon.

As shown in Figure 3, guide roller 36 is rotatably mounted on pin 13 and serves to guide pin 13 in its sidewise movement between guide rails 37 and 38. Roller 36 is fixed against longitudinal movement on pin 13 by shoulder 39 provided by arm 32 and shoulder 40 provided by sleeve 41. Sleeve 41 is rigidly secured on pin 13 as by screw 42. Sleeve 41 is suitably flanged, as at 43, and thus serves as a base for mounting supporting block 44 of wood or other suitable material. Block 44 may be rigidly secured to flange 43 as by screws 45.

Guide rails 37 and 38 are respectively secured, as by arms 46 and 47, to frame uprights 28 and 29. As viewed in Figures 1 and 3, it is seen that guide rails 37 and 38 are suitably formed for controlling the movement of the pins 13 sidewise of the normal path of travel of conveying means 1. The pins 13, as illustrated in Figure 3, are adapted for sidewise movement through substantially 75°.

In operation, a supply of hog heads on table 48 are individually mounted on the successive pins by an operator. The position of each head, as it is moved in a forwardly dirction on the conveying means, is automatically corrected by sidewise movement of the pins to the best advantage for the immediate trimming operation. The several trimming operations may be successively performed along the path of travel of the conveying means, after which the trimmed head may be removed for splitting the skull and removing the brain.

I claim:

1. In a device for conveying the heads of animal carcasses during trimming thereof, including an endless conveyer provided with a series of spaced head carrying pins, means pivotally mounting each of the pins for positive sidewise movement while being moved in a forwardly direction on the conveyer comprising a pivot arm pivotally secured within a bracket rigidly secured to the conveyer, said pivot arm being adapted to rigidly secure one end of a pin, a guide rail mounted to each side of the pin, intermediate the ends of the pin and laterally of the line of carriage of the pin on the conveyer, said guide rails defining in part a path laterally of the path of movement of the conveyer, a roller freely rotatable on the pin and between the guide rails and a carcass head supporting means rigidly affixed to the pin, said pivot arm and said head supporting means providing bearing shoulders for said roller.

2. In a device for conveying the heads of animal carcasses, a pivot carrier, a roller loosely mounted on the carrier, a support above the roller, a head carrying pin extending through the support and roller and mounted in the carrier, the said support and carrier constituting side bearings for said roller, a conveying means and a guide means associated with said conveying means and said pivot carrier for causing said pin to be shifted laterally in opposite directions successively.

B. J. SADOFF.